United States Patent
Ben-Shachar et al.

(10) Patent No.: US 12,248,079 B2
(45) Date of Patent: *Mar. 11, 2025

(54) ANGLE OF ARRIVAL ESTIMATION USING A SINGLE RECEIVE CHAIN

(71) Applicant: TEXAS INSTRUMENTS INCORPORATED, Dallas, TX (US)

(72) Inventors: Matan Ben-Shachar, Kibbutz Givat Haim Ihud (IL); Oren Shani, Kfar-Saba (IL); Yaron Alpert, Hod Hasharon (IL); Yuval Jakira, Pardes Hanna-Karkur (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/140,283

(22) Filed: Apr. 27, 2023

(65) Prior Publication Data
US 2023/0258758 A1 Aug. 17, 2023

Related U.S. Application Data

(63) Continuation of application No. 17/325,029, filed on May 19, 2021, now Pat. No. 11,668,781.

(51) Int. Cl.
| | | |
|---|---|---|
| G01S 5/04 | (2006.01) | |
| G01S 3/46 | (2006.01) | |
| G01S 3/72 | (2006.01) | |
| G01S 3/48 | (2006.01) | |
| G01S 3/50 | (2006.01) | |

(52) U.S. Cl.
CPC .............. *G01S 3/46* (2013.01); *G01S 3/72* (2013.01); *G01S 3/465* (2013.01); *G01S 3/48* (2013.01); *G01S 3/50* (2013.01)

(58) Field of Classification Search
CPC ... G01S 3/46; G01S 3/72; G01S 3/465; G01S 3/48; G01S 3/50; G01S 3/02
USPC .................................................. 342/442, 445
See application file for complete search history.

(56) References Cited

U.S. PATENT DOCUMENTS

| | | |
|---|---|---|
| 7,139,584 B2 | 11/2006 | Lin |
| 7,167,508 B2 | 1/2007 | Lin |
| 8,884,820 B2 | 11/2014 | Poisel |
| 10,509,116 B2 | 12/2019 | McLaughlin |
| 10,560,829 B2* | 2/2020 | Haverinen ............... H04W 4/80 |
| 11,215,704 B2 | 1/2022 | McLaughlin |
| 11,269,044 B2* | 3/2022 | Stitt ........................... G01S 3/64 |
| 11,313,937 B2 | 4/2022 | Fort |
| 11,356,157 B2* | 6/2022 | Lehtimaki ................ G01S 3/043 |
| 11,486,957 B2* | 11/2022 | Lehtimaki ................ H04W 4/80 |
| 11,493,588 B2 | 11/2022 | Stitt |

(Continued)

*Primary Examiner* — Chuong P Nguyen
(74) *Attorney, Agent, or Firm* — Mandy Barsilai Fernandez; Frank D. Cimino

(57) ABSTRACT

Techniques for determining an angle-of-arrival of a wireless transmission are provided, including receiving, with a first antenna, at least a first portion of a wireless transmission, determining when a second portion of the wireless transmission will be received, switching to the second antenna to receive the second portion of the wireless transmission, determining an angle of arrival of the wireless transmission based on the first portion and the second portion of the wireless transmission, and outputting the angle of arrival of the wireless transmission.

20 Claims, 5 Drawing Sheets

(56) References Cited

U.S. PATENT DOCUMENTS

| | | | |
|---|---|---|---|
| 11,668,781 B2 * | 6/2023 | Ben-Shachar | G01S 3/043 |
| | | | 342/442 |
| 2014/0269389 A1 | 9/2014 | Bukkfejes | |
| 2015/0234033 A1 * | 8/2015 | Jamieson | G01S 3/12 |
| | | | 455/456.1 |
| 2016/0334498 A1 * | 11/2016 | Jamieson | G01S 5/02213 |
| 2019/0178972 A1 * | 6/2019 | Simileysky | G01S 3/48 |
| 2020/0178054 A1 * | 6/2020 | Simileysky | H04B 17/336 |
| 2020/0264257 A1 | 8/2020 | Stitt | |
| 2021/0302528 A1 | 9/2021 | Wang | |
| 2021/0356550 A1 | 11/2021 | Lee | |
| 2021/0399775 A1 | 12/2021 | Lehtimaki | |

* cited by examiner

ANGLE OF ARRIVAL ESTIMATION USING A SINGLE RECEIVE CHAIN

CROSS-REFERENCES TO RELATED APPLICATIONS

This application is a continuation of U.S. patent application Ser. No. 17/325,029, filed May 19, 2021, which application is incorporated herein by reference.

BACKGROUND

Wireless receivers may be configured to support positioning based on a received signal. Positioning based on the received signal can help locate where a wireless receiver is in reference to the transmitter of the received signal. Being able to locate the receiver relative to the transmitter may help with navigation within an enclosed space (e.g., indoor spaces), proximity services, beacon services, etc. Often accurate positioning is performed using information provided by multiple techniques including, for example, received signal strength indication (RSSI), time of flight (ToF), spatial fingerprinting, and angle of arrival (AOA). Generally, an AOA measurement can provide an estimate an angle of an incoming signal corresponding to an angular location of the transmitter relative to the receiver. Traditionally, a receiver with multiple antennas and multiple receive chains is used to perform the AOA measurement. However, including multiple receive chains can increase the cost, complexity, and/or power consumption of the receiver.

SUMMARY

This disclosure relates to a circuit including a memory, a received chain, and one or more processors operatively coupled to the memory, wherein the one or more processors are configured to execute instructions causing the one or more processors to: receive, by the receive chain, at least a first portion of a wireless transmission using a first antenna, determine when a second portion of the wireless transmission will be received, receive, by the receive chain, a second portion of the wireless transmission using a second antenna, determine an angle of arrival of the wireless transmission based on the first portion and the second portion of the wireless transmission, and output the angle of arrival of the wireless transmission.

Another aspect of the present disclosure relates to a technique including receiving, with a first antenna, at least a first portion of a wireless transmission, determining when a second portion of the wireless transmission will be received, switching to the second antenna to receive the second portion of the wireless transmission, determining an angle of arrival of the wireless transmission based on the first portion and the second portion of the wireless transmission, and outputting the angle of arrival of the wireless transmission.

Another aspect of the present disclosure relates to a wireless device, including: a receive chain, a first antenna coupled to the receive chain, a second antenna coupled to the receive chain, a memory, and one or more processors operatively coupled to the memory, wherein the one or more processors are configured to: execute instructions causing the one or more processors to receive, with the first antenna, at least a first portion of a wireless transmission, determine when a second portion of the wireless transmission will be received, switch to the second antenna to receive the second portion of the wireless transmission, determine an angle of arrival of the wireless transmission based on the first portion and the second portion of the wireless transmission, and output the angle of arrival of the wireless transmission.

BRIEF DESCRIPTION OF THE DRAWINGS

For a detailed description of various examples, reference will now be made to the accompanying drawings in which.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
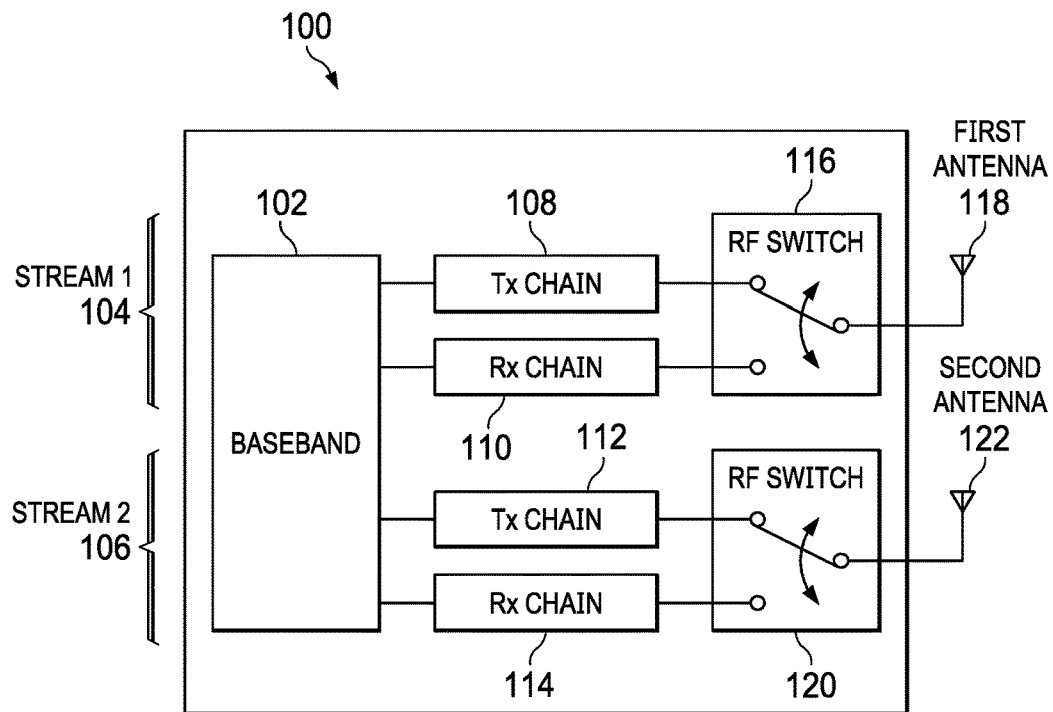
FIG. 1 is a circuit diagram of a wireless transceiver with two receive chains, in accordance with aspects of the present disclosure.

FIG. 1 is a circuit diagram of a wireless transceiver 100 with two receive chains, in accordance with aspects of the present disclosure. As shown, wireless transceiver 100 includes a baseband processor 102 configured to handle two radio frequency (RF) streams, here a first stream 104 and a second stream 106. The baseband processor 102 is a processor that manages the radio functionality. The baseband processor 102 may be coupled to a first transmit chain 108 and a first receive chain 110 associated with the first stream 104. The transmit chains include a set of coupled circuits (not shown) which receive a digital signal output from the baseband processor 102 and convert the digital signal to a properly formatted analog signal appropriate for the wireless system and output the analog signal to an antenna. For example, a transmit chain may include a plurality of coupled circuits including, but not limited to, a digital/analog convertor, low pass filter, mixer, power amplifier, etc. Similarly, a receive chain may include a set of coupled circuits (not shown) which receive an analog signal output from the antenna and convert the analog signal to a properly formatted digital signal that is output to the baseband processor. As an example, the receive chain may include a plurality of coupled circuits including, but not limited to, an analog/digital convertor, adjustable gain controller, mixer, low noise amplifier, etc. In this example, the baseband processor 102 is also coupled to a second transmit chain 112 and a second receive chain 114 associated with the second stream 116. The first transmit chain 108 and the first receive chain 110 may be coupled, via a first RF switch 116, to a first antenna 118. Similarly, the second transmit chain 112 and second receive chain 114 may be coupled, via a second RF switch 120, to a second antenna 122. The wireless transceiver 100 operates in a half duplex mode. As such, the wireless transceiver 100 can operate, at any point in time, in either a receive mode or a transmit mode based on the state of the RF switches 116 and 120.

Figure 2:
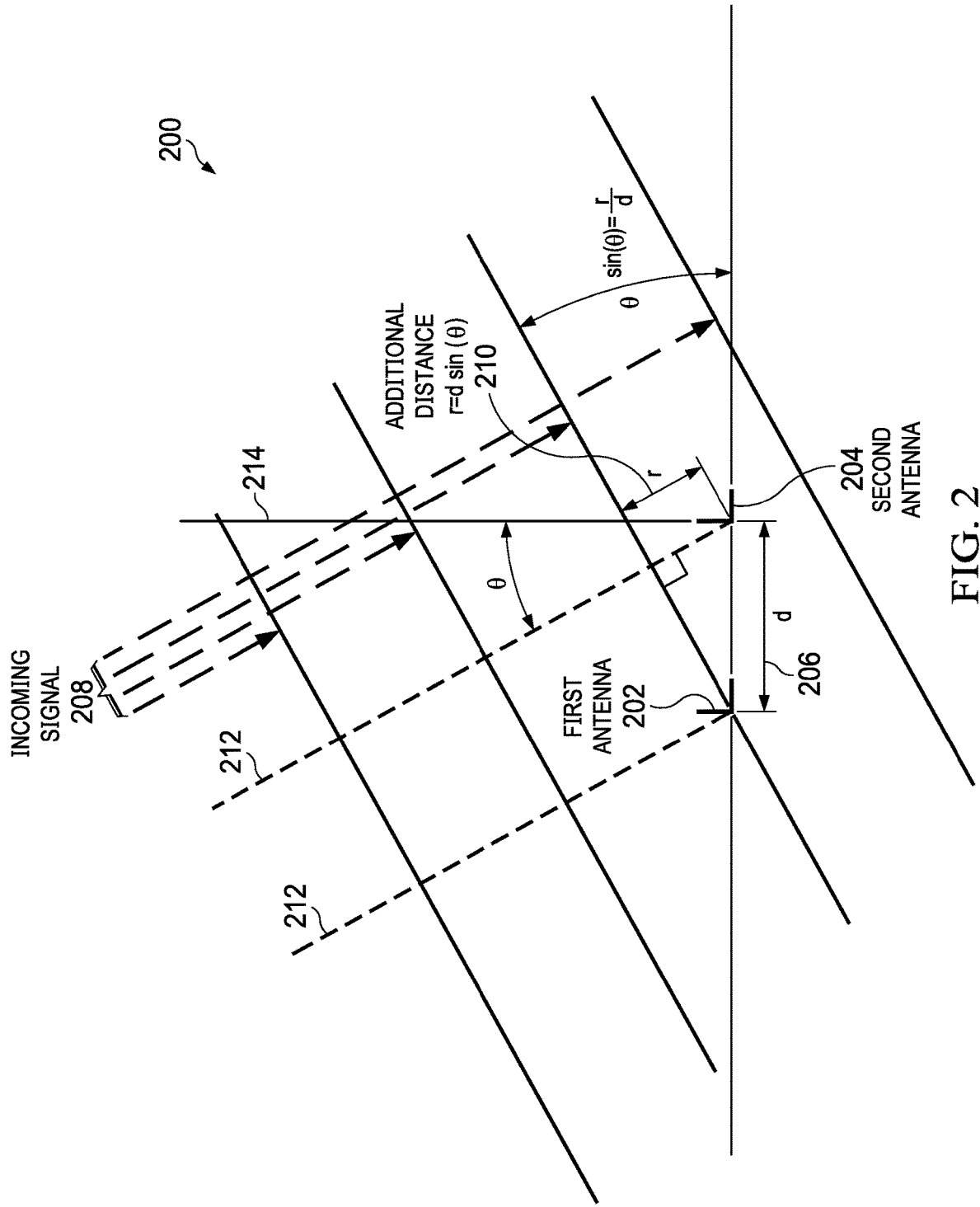
FIG. 2 is a conceptual diagram illustrating angle of arrival determination, in accordance with aspects of the present disclosure.

FIG. 2 is a conceptual diagram 200 illustrating angle of arrival determination, in accordance with aspects of the present disclosure. Angle of arrival measurements take advantage of being able to triangulate (e.g., estimate a location using three angles) an incoming signal using a time difference between the incoming signal received at multiple antennas. Conceptual diagram 200 illustrates a simplified example determination of an AoA using two antennas, a first antenna 202 and a second antenna 204. In this example, the first antenna 202 may correspond to first antenna 118 of FIG. 1 and second antenna 204 may correspond to second antenna 122. It may be understood that any number of antennas greater than two may be used. The first antenna 202 is separated from the second antenna 204 by a distance of d 206. An incoming signal 208 with an AoA angle of θ, frequency f, and wavelength λ (where the wavelength is 1 divided by the frequency of the incoming signal), may be received by the first antenna 202 and the second antenna 204. As shown in FIG. 2, a wave front of the incoming signal 208 is shown arriving at an angle represented by the dashed lines 212, which are normal to the wave front and solid line 214 represents an axis perpendicular to an axis on which the first antenna 202 and the second antenna 204 are on. The incoming signal 208 has to travel further by an additional distance r210 to the second antenna 204 as compared to the distance traveled to the first antenna 202. The distance r210 is a function of d and θ such that r=d sin(θ). As the incoming signal 208 has to travel further to arrive at antenna 204, there is a phase shift as between the signal received by the first antenna 202 and the second antenna 204. The phase refers the relationship between positions of the amplitude crest and trough of two waveforms and may be represented by ϕ. A phase shift (ΔΦ) as between two antennas may then be expressed as $$\Delta\Phi = -2\pi \frac{d \sin(\theta)}{\lambda},$$

where the phase shift is measured as between the incoming signal 208 as received by first antenna 202 (and corresponding first receive chain) and the incoming signal 208 as received the second antenna 204 (and corresponding second receive chain). The AoA can then be calculated as $$\theta = \arcsin\left(\frac{\Delta\Phi * \lambda}{-2\pi d}\right).$$

It may be understood that the preceding technique for determining an AoA is illustrative and other techniques for determining an AoA may be used. For example, a multiple signal classification (MUSIC) algorithm for multipath signals may be used to determine an AoA. In certain cases, the AoA may be determined based on differences between a received signal strength of the incoming signal 208 as between antenna 202 and antenna 204.

Figure 3:
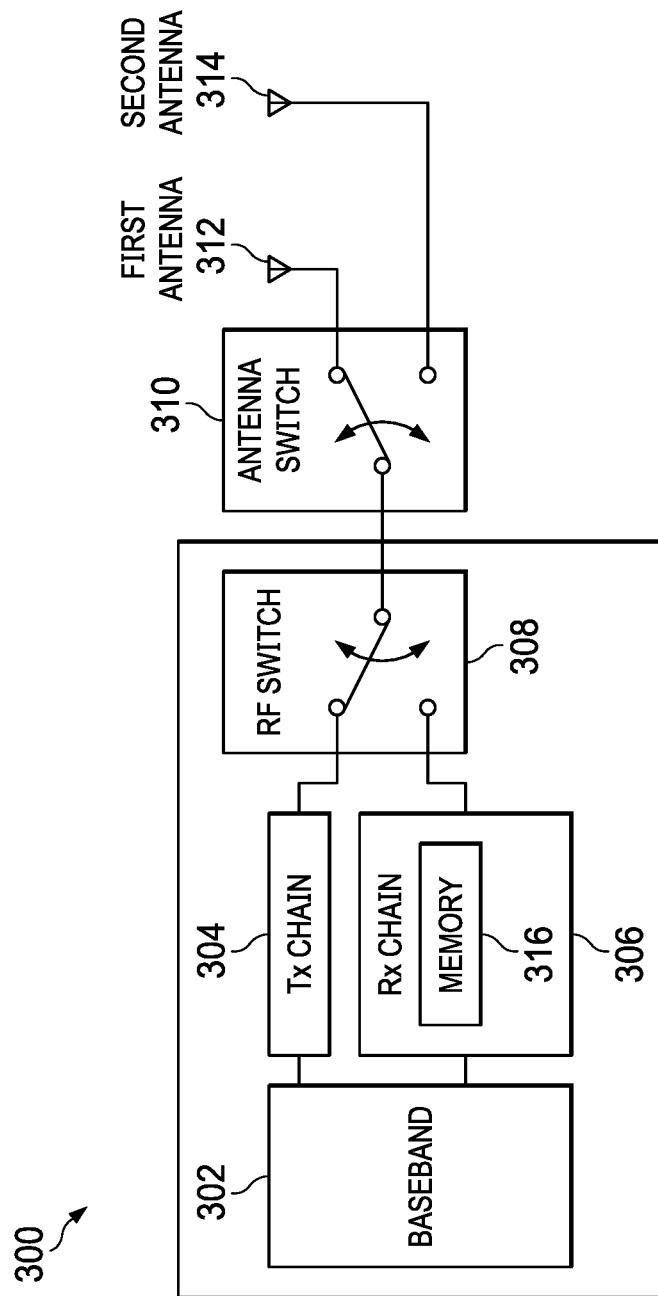
FIG. 3 is a circuit diagram of a wireless transceiver capable of determining an AoA with a single receive chain, in accordance with aspects of the present disclosure.

FIG. 3 is a circuit diagram of a wireless transceiver 300 capable of determining an AoA with a single receive chain, in accordance with aspects of the present disclosure. In wireless transceiver 300, the baseband processor 302 is coupled to a transmit chain 304 and a receive chain 306. The transmit chain 304 includes a set of coupled circuits (not shown) which receive a digital signal output from the baseband processor 302 and convert the digital signal to a properly formatted analog signal appropriate for the wireless system and output the analog signal via a RF switch 308 and antenna switch 310 between one of either a first antenna 312 or a second antenna 314. Similarly, the receive chain 306 also includes a set of coupled circuits (not shown) which receive an analog signal output from one of either the first antenna 312 or the second antenna 314 via the antenna switch 310 and RF switch 308 and converts the analog signal to a properly formatted digital signal that is output to the baseband processor. In certain cases, the receive chain 306 may also include a memory 316. While shown as a part of the receive chain 306, it may be understood that memory 316 may be incorporated in another portion of the transceiver, such as the baseband 302. In some cases, memory 316 may be a cache, register, or other storage system dedicated to recording portions of or information related to a received transmission. In other cases, memory 316 may be a portion of a general purpose memory. In certain cases, the memory 316 may also include non-transitory instructions that may be executed by a processer, such as the baseband processor 302. In certain cases, the non-transitory instructions may be configured to cause the processor, such as baseband processor 302, to perform aspects of the techniques described in this disclosure. It may also be understood that the techniques discussed herein help enable a single receive chain to perform an AoA measurement, but they do not preclude the use of multiple receive chains. For example, by allowing a single receive chain to be used to perform an AoA measurement, a transceiver with two receive chains may be able to generate two AoA measurements rather than a single AoA measurement, potentially increasing accuracy.

In accordance with aspects of the present disclosure, existing characteristics of wireless transmissions may help enable a single receive chain perform an AoA measurement. For example, existing wireless protocols often include certain predefined signals such as preambles, pilot symbols, pilot carriers/subcarriers or other predefined transmissions, which are repeatedly transmitted as a cyclic signal such that the transmissions are the same across multiple symbols. For example, a particular preamble may comprise a predefined set of symbols transmitted at a predefined rate, and these symbols and rate may be defined, for example, in a specification for the wireless system.

In accordance with aspects of the present disclosure, the AoA of a transmission may be determined using a single receive chain coupled to, and switchable between, multiple antennas, such as shown in transceiver 300. For example, the transceiver 300 may receive a first portion of a predefined wireless transmission via a first antenna. In certain cases, the first portion of the wireless transmission may be a portion of a received packet. For example, the first portion may be a portion (e.g., one or more symbols) of a preamble, such as a legacy preamble long training field, short training field, etc., a portion of a packet body, such as a pilot tone at an unused portion of the packet, or a pad at an end of the packet, such as a zero pad at an end of a wireless transmission, or other predefined wireless transmission where certain aspects of the wireless transmission are expected. As an example of a zero pad, if there is insufficient data to be transmitted to fill an entire data portion of a data packet, zeros may be added to the end of the data to fill out (e.g., pad) the data portion of the data packet. In certain cases, the zero pad may be detected based on, for example, a number of zeros being received and an expected length of the packet. In other cases, the first portion of the received wireless transmission may be a predefined pilot subcarrier of a symbol. Generally, a pilot signal may be transmitted on specific subcarriers of a symbol and include predefined information that may be used to help decode other symbols. These predefined signals may be already present in existing wireless systems. In certain cases, these predefined signals may be intended for (e.g., addressed to, or otherwise directed toward) the receiving wireless device, or another wireless device. For example, a preamble may be included in every transmission for certain wireless systems and the preamble may be used for AoA determination with respect to the transmitter, such as an access point, regardless of the intended receiving wireless device. Similarly, pilot signals may be detected in a transmission regardless of the intended receiving wireless device. In certain cases, the received first portion of the wireless transmission may be saved to a memory, such as memory 316. In certain cases, the saved first portion may be a recording of the wireless transmission. In certain cases, the saved first portion may be a mathematical function or operation describing the first portion of the wireless transmission, such as a post fast-Fourier transform bin information. In certain cases, this recording may be a part of the wireless transmission to be used for AoA measurement, such as the preamble, pilot signals or symbols, zero pad areas, etc.

Of note, according to aspects of the present disclosure, utilizing predefined signals for AoA determination repurposes existing signals in a wireless system, rather than utilizing a signal specific signal for AoA, antenna switching, or location functionality. For example, the techniques discussed herein may reuse a preamble or pilot carrier of a legacy wireless system, such as 802.11 a/b/g/n/ac, for AoA measurements without changes to the existing transmission format. As another example, the techniques discussed herein may be performed without first requesting for an AoA measurement, antenna switching, or location signal and then receiving the AoA measurement, antenna switching, or location signal to perform the AoA measurement.

The transceiver 300 may switch to a second antenna and receive a second portion of the predefined wireless transmission. In certain cases, the second portion of the predefined wireless transmission may be determined based on a modulation and bit rate of the predefined wireless transmission such that the first portion of the wireless transmission and the second portion of the wireless transmission are expected to have the same information and phase difference as the first portion. Any difference with respect to the phase as between the first portion of the wireless transmission and the second portion of the wireless transmission may be due to the distance the wireless transmission travels between the first and second antennas. Thus, the difference in phase as between the first portion of the wireless transmission and the second portion of the wireless transmission may be measured as the phase shift as between the first antenna and the second antenna for use in determining the AoA.

After the AoA measurement, the transceiver may continue to receive a remainder of the wireless transmission (e.g., packet). For example, where the first portion of the wireless transmission occurs prior to a data transmission directed to the transceiver, such as in a preamble, or pilot signal, data directed to the transceiver may be included, for example, in a body or data portion of the wireless transmission. The transceiver may, after determining the AoA of the wireless transmission, continue to receive the remainder of the wireless transmission. In certain cases, the transceiver may switch back to the first antenna to continue receiving the remainder of the wireless transmission. In certain cases, the transceiver may also continue to receive at least a portion of the remainder of the wireless transmission. For example, the transceiver may perform the AoA measurement, continue to receive another portion of the wireless transmission, determine that the wireless transmission is directed at another transceiver, and stop receiving the remainder of the wireless transmission.

Figure 4A:
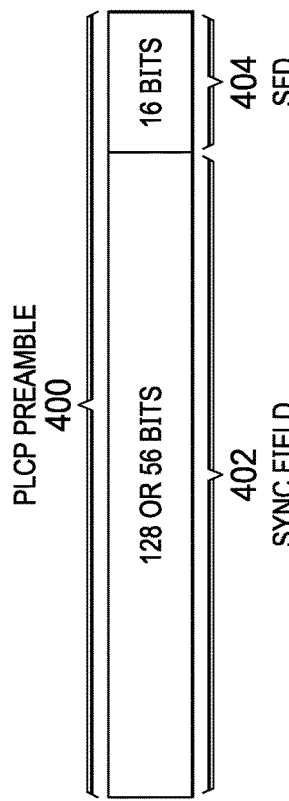
FIGS. 4A-4C illustrate example predefined signals of wireless systems, in accordance with aspects of the present disclosure.
Figure 4B:
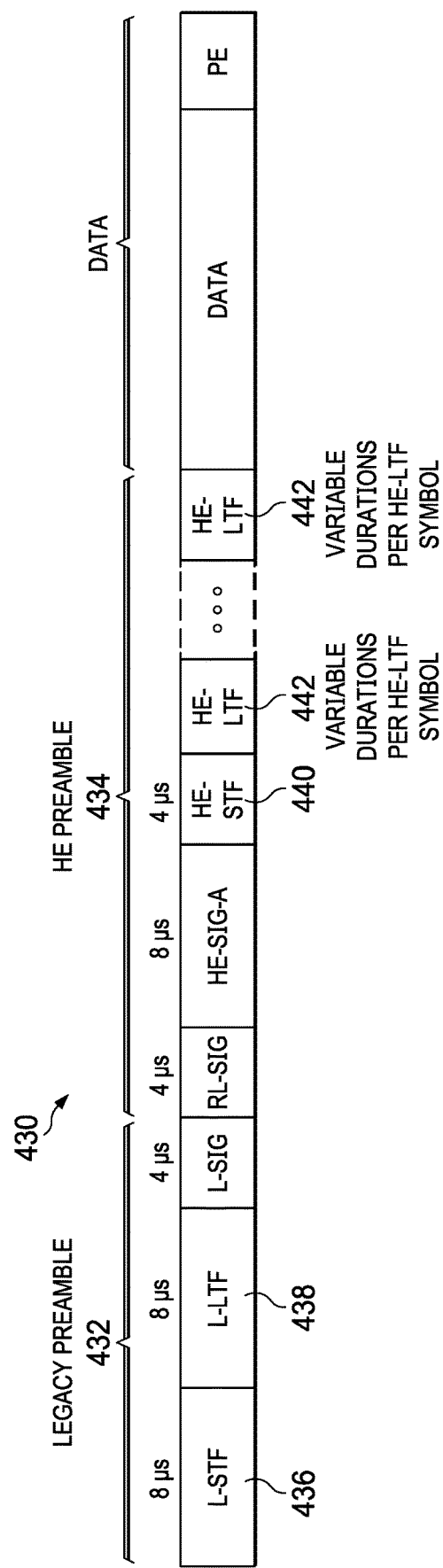
Figure 4C:
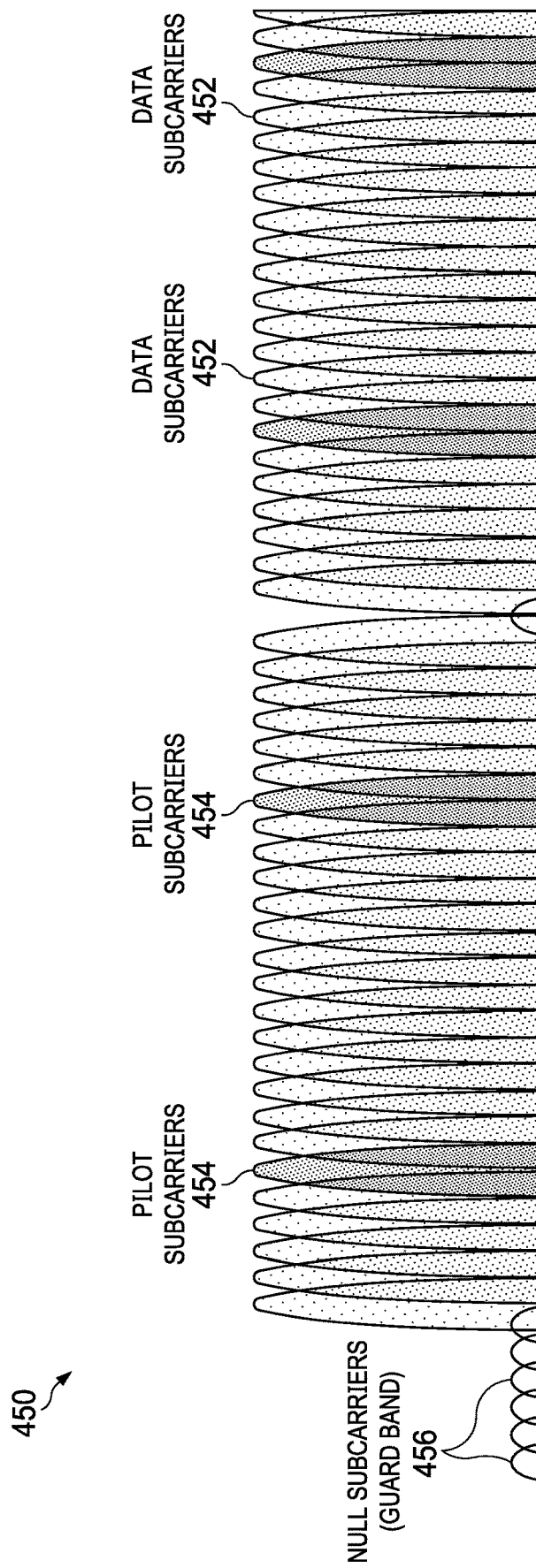

FIGS. 4A, 4B, and 4C illustrate example predefined signals of wireless systems, in accordance with aspects of the present disclosure. In FIG. 4A, a preamble 400 for a transmission in a wireless system is shown. In this example, preamble 400 may be a physical layer convergence protocol (PLCP) preamble for 802.11b. While an 802.11b preamble is used as an example, it should be understood that the techniques discussed herein may be applicable to any wireless protocol which includes repeated synchronization, preamble, or otherwise predefined signals. For example, a beacon may broadcast a repetitive, predetermined set of data symbols and this set of data symbols may be used to determine an AoA in a manner consistent to that discussed with respect to the preamble 400.

In certain cases, the preamble 400 may be included before each transmission of a wireless system, such as 802.11b and the preamble 400 may be used to help a wireless receiver synchronize with the transmission. The contents of the preamble 400 may be predefined, such as in a specification for the wireless network, and the contents of the preamble 400 are expected by wireless devices of wireless system. In this example, the preamble 400 includes a synchronization field 402 and a start frame delimiter (SFD) 404 field. In certain cases, the synchronization field 402 may include 128 bits for a long preamble, or 56 bits for a short preamble, where each bit comprises a repeated value, such as '0' or '1'. In addition, the preamble 400 is transmitted at a predefined bit rate, modulation, and number of phase shifts per bit. Thus, the transceiver 300, upon receiving the first portion of the preamble 400 expects another portion of the preamble 400 to be received at a certain period of time.

In accordance with aspects of the present disclosure, the transceiver 300 may receive a first portion of the preamble 400 using a first antenna, such as first antenna 312. In certain cases, the first portion of the wireless transmission may include one or more symbols. This received first portion of the preamble 400 may be stored in a memory, such as memory 316. In certain cases, the saved first portion may be a recording of the first portion of wireless transmission to be used for AoA measurement, such as a portion of the preamble 400.

The transceiver 300 may switch to a second antenna, such as second antenna 314 to receive an expected, second, portion of the preamble 400. The transceiver may determine an antenna switching period, based on an amount of time needed to switch between the first antenna and the second antenna. This determination may be based, for example on a preconfigured switching period, or determined by tracking an amount of time needed to start receiving the transmission after switching the antennas. Additionally, as the number of phase shifts per bit are based on the modulation, along with the bit rate are predefined, a time N as between each phase shift can be defined. In certain cases, a multiplier of N, such a 2N for binary phase shift keying (BPSK) or 4N for quadrature phase shift keying (QPSK), may then correspond to a full phase shift rotation. As the synchronization field 402 repeats the same value over a predefined number of bits at a predefined bit rate with a predefined phase shift, the phase of the preamble 400, as transmitted, is identical as between each phase shift rotation cycle. Thus, any difference in phase as between corresponding portions of the phase shift rotation cycle for the first portion and the second portion are caused by the difference in distance r travelled by the incoming signal between the first antenna and second antenna. The transceiver may determine a phase continuity time to receive the second portion of the preamble 400 corresponding to the received first portion based on the switching period, time N, and a multiplier of time N as needed. The transceiver receives the second portion of the preamble 400 based on the phase continuity time. In certain cases, the transceiver may record the second portion of the preamble 400 to the memory. The AoA may then be calculated via any known AoA technique based on the saved first portion of the preamble 400 and the second portion the preamble 400.

FIG. 4C illustrates a frame structure 430 of a wireless system, in accordance with aspects of the present disclosure. The frame structure 430 represents a 802.11 ax frame, which may include a legacy preamble 432 for backwards compatibility with other wireless systems. The frame structure 430 may also include an 802.11ax preamble (e.g., HE (high efficiency)) preamble 434. The techniques discussed above with respect to 802.11b packets may be similarly applicable to 802.11ax. For example, the legacy short training field (L-STF) 436 and/or the legacy long training fields (L-LTF) of the preamble may be utilized at the first and second portions of the wireless transmission. As a more detailed example, the transceiver, upon detecting L-STF 436, may expect to then receive L-LTF 438, the transceiver may then receive a first portion of the L-LTF 438 using a first antenna, switch to a second antenna, and receive a second portion of the L-LTF 438. Similarly, for the HE preamble 434, the wireless transceiver may utilize the high efficiency short training field (HE-STF) 440 and high efficiency long training fields (HE-LTF) 442 for the first and second portions of the wireless transmission. As a more detailed example, the transceiver, upon detecting HE-STF 440, may expect to then receive multiple HE-LTFs 442. In 802.11ax, the HE-LTF 442 may be used for enhanced channel estimation, beamforming, MIMO spatial diversity, and the exact number of HE-LTFs 442 transmitted may vary, for example, based on the configuration of the wireless system. Where multiple HE-LTFs 442 are transmitted, the transceiver may receive a first HE-LTF 442 using a first antenna as the first portion of the wireless transmission, switch to a second antenna, and receive a second HE-LTF 442 as the second portion of the wireless transmission.

In FIG. 4C, an example orthogonal frequency-division multiplexing (OFDM) signal 450 of a wireless system is shown. Certain wireless systems may utilize an OFDM where each symbol of the OFDM signal 450 includes multiple subcarriers including data subcarriers 452 and pilot signals on pilot subcarriers 454. In certain cases, guard bands 456 may separate frequencies of the OFDM signal 450 from other transmissions. The pilot subcarriers 454 may be included in an OFDM signal 450 at predefined intervals. For example, the pilot subcarriers 454 may be present during each symbol, every other symbol, or based on another predefined pattern. The polarity, phase, and bit rate of the pilot subcarriers 454 may be predefined, such as in a specification for the wireless network and the same pilot signal may be transmitted at the predefined intervals. Thus, the transceiver 300, upon receiving a first pilot subcarrier 454, as a first portion of the wireless transmission, expects a second pilot subcarrier 454, as a second portion of the wireless transmission to be received at a later time.

In accordance with aspects of the present disclosure, the transceiver 300 may receive a first portion of the wireless transmission, such as the first pilot subcarrier 454, using a first antenna, such as first antenna 312. This received first portion may be stored in a memory, such as memory 316. In certain cases, the saved first portion may be a recording of the wireless transmission. In certain cases, this recording may be a part of the wireless transmission to be used for AoA measurement, such as the pilot subcarriers.

The transceiver 300 may switch to a second antenna, such as second antenna 314 to receive an expected, second portion of the wireless transmission, such as a second pilot subcarrier 454. The transceiver may determine an antenna switching period, based on an amount of time needed to switch between the first antenna and the second antenna. This determination may be based, for example on a preconfigured switching period, or determined by tracking an amount of time needed to start receiving the transmission after switching the antennas. Additionally, a time N may be defined based on expected phase shifts, bit rate of the pilot subcarriers, and predefined intervals. In certain cases, a multiplier of N, such a 2N for BPSK or 4N for QPSK, may then correspond to a full phase shift rotation. As the pilot subcarriers have a constant content, any difference in phase as between corresponding portions of the phase shift rotation cycle for the first pilot subcarrier and the second pilot subcarrier are caused by the difference in distance r travelled by the incoming signal as between the first antenna and second antenna. The transceiver may determine a phase continuity time to receive an expected (e.g., second) pilot subcarrier 454 corresponding to the received first pilot subcarrier 454 based on the switching period, time N, and a multiplier of time N, as needed. The transceiver receives the second pilot subcarrier based on the phase continuity time. In certain cases, the transceiver may record the second pilot subcarrier to the memory. The AoA may then be calculated via any known AoA technique based on the saved first pilot subcarrier (e.g., first portion) and the second pilot subcarrier (e.g., second portion).

Figure 5:
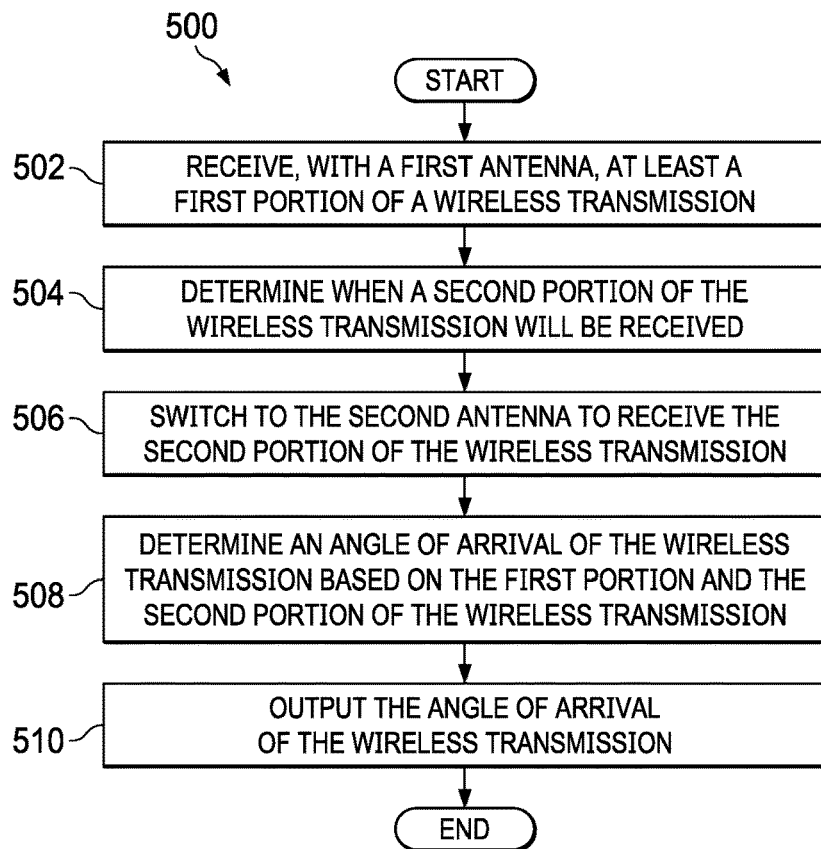
FIG. 5 is a is a flow diagram illustrating a technique for AoA determination, in accordance with aspects of the present disclosure.

FIG. 5 is a flow diagram illustrating a technique 500 for AoA determination, in accordance with aspects of the present disclosure. At block 502 at least a first portion of a wireless transmission may be received by a first antenna. For example, a receiver may receive a first portion of a predefined wireless transmission via a first antenna. In certain cases, the portion of the predefined wireless transmission may be already present in existing wireless systems, such as preambles, pilot symbols or subcarriers, beacons, zero pad at an end of a wireless transmission, etc. In certain cases, the first portion may be saved to a memory. At block 504, a determination when a second portion of the wireless transmission will be received is made. For example, the baseband processor may determine when the second portion of the wireless transmission will be received and the determination of when to receive the second portion may take into account an amount of time needed to switch between the first antenna and the second antenna. The determination may also take into account the modulation coding scheme (MCS) and bandwidth (BW) of the wireless transmission. At block 506, the second portion of the wireless transmission is received after switching to the second antenna. For example, the first antenna and the second antenna may be coupled to a single receive chain via an antenna switch. The baseband processor may indicate, to the antenna switch, to perform the antenna switch. At block 508, an angle of arrival of the wireless transmission may be determined based on the first portion and the second portion of the wireless transmission. For example, the baseband processor may determine a phase shift between the saved first portion and the received second portion of the wireless transmission and this phase shift may be used to determine an AoA. At block 510, the angle of arrival of the wireless transmission is output. For example, the baseband processor may output the determined AoA.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A wireless device comprising:
   a first switch comprising a first terminal coupled to a first antenna terminal that is configured to be coupled to a first antenna, a second terminal coupled to a second antenna terminal that is configured to be coupled to a second antenna, and a third terminal;
   a second switch comprising a first terminal coupled to the third terminal of the first switch, a second terminal, and a third terminal;
   a transmitter chain coupled to the second terminal of the second switch;
   a receiver chain coupled to the third terminal of the second switch, wherein the receiver chain is configured to receive a first portion of a wireless transmission via the first antenna, and a second portion of the wireless transmission via the second antenna; and
   a processor configured to:
      determine an angle of arrival of the wireless transmission based on the first and second portions, and
      output the angle of arrival.

2. The wireless device of claim 1, wherein the receiver chain is configured to receive, after receiving the second portion via the second antenna, a remainder of the wireless transmission.

3. The wireless device of claim 2, wherein the processor is configured to decode the remainder of the wireless transmission.

4. The wireless device of claim 1, wherein the receiver chain is configured to receive a remainder of the wireless transmission via the first antenna.

5. The wireless device of claim 1, wherein after the angle of arrival is determined, the receiver chain is configured to stop receiving a remainder of the wireless transmission.

6. The wireless device of claim 1, wherein the wireless transmission comprises a preamble, wherein the first portion comprises a first symbol of the preamble, and wherein the second portion comprises a second symbol of the preamble.

7. The wireless device of claim 1, wherein the wireless transmission comprises a physical layer convergence protocol (PLCP) preamble, and wherein the first and second portions are first and second portions of the PLCP preamble.

8. The wireless device of claim 1, wherein the wireless transmission comprises a preamble, wherein the first portion comprises a first portion of a legacy long training field of the preamble, and wherein the second portion comprises a second portion of the legacy long training field.

9. The wireless device of claim 1, wherein the wireless transmission comprises a preamble, wherein the first portion comprises a first high efficiency long training field of the preamble, and wherein the second portion comprises a second high efficiency long training field of the preamble.

10. The wireless device of claim 1, wherein the wireless transmission comprises a plurality of pilot subcarriers at predefined intervals, wherein the first portion comprises a first pilot subcarrier of the plurality of pilot subcarriers, and wherein the second portion comprises a second pilot subcarrier of the plurality of pilot subcarriers.

11. The wireless device of claim 1, wherein the first portion is stored in a memory, and wherein the processor is configured to determine the angle of arrival of the wireless transmission based on the stored first portion.

12. The wireless device of claim 1, wherein the processor is configured to determine when to switch the first switch based on a modulation coding scheme (MCS) and bandwidth of the wireless transmission.

13. The wireless device of claim 1, wherein the processor is configured to cause switching of the first switch during reception of a body of the wireless transmission.

14. The wireless device of claim 1, wherein the wireless transmission is addressed to another wireless device.

15. The wireless device of claim 1, wherein the wireless transmission comprises orthogonal frequency-division multiplexing (OFDM) symbols.

16. A wireless device comprising:
   a first antenna terminal configured to be coupled to a first antenna;
   a second antenna terminal configured to be coupled to a second antenna;
   a receiver chain coupled to the first and second antenna terminals, wherein the receiver chain is configured to receive a first portion of a wireless transmission via the first antenna, and a second portion of the wireless transmission via the second antenna; and
   a processor configured to:
      determine an angle of arrival of the wireless transmission based on the first and second portions, and
      output the angle of arrival, wherein the wireless transmission is addressed to another wireless device.

17. The wireless device of claim 16, wherein the receiver chain is configured to receive, after receiving the second portion via the second antenna, a remainder of the wireless transmission via the first antenna.

18. The wireless device of claim 16, wherein the wireless transmission comprises a plurality of pilot subcarriers at predefined intervals, wherein the first portion comprises a first pilot subcarrier of the plurality of pilot subcarriers, and wherein the second portion comprises a second pilot subcarrier of the plurality of pilot subcarriers.

19. The wireless device of claim 16, further comprising a switch having a first terminal coupled to the first antenna terminal, a second terminal coupled to the second antenna terminal, and a third terminal coupled to the receiver chain.

20. A wireless device comprising:
   a first antenna terminal configured to be coupled to a first antenna;
   a second antenna terminal configured to be coupled to a second antenna;
   a receiver chain coupled to the first and second antenna terminals, wherein the receiver chain is configured to receive a first portion of a wireless transmission via the first antenna, and a second portion of the wireless transmission via the second antenna; and
a processor configured to:
  determine an angle of arrival of the wireless transmission based on the first and second portions, and
  output the angle of arrival, wherein the wireless transmission is addressed to another wireless device, wherein the receiver chain is configured to receive, after receiving the second portion via the second antenna, a remainder of the wireless transmission via the first antenna.

* * * * *